US 7,055,167 B1

(12) United States Patent
Masters

(10) Patent No.: US 7,055,167 B1
(45) Date of Patent: May 30, 2006

(54) PERSONAL VIDEO RECORDER AND METHOD ENABLING A HISTORY PULL DOWN FUNCTION FOR PROGRAM SELECTION

(75) Inventor: Bradley S. Masters, Mission Viejo, CA (US)

(73) Assignee: Keen Personal Media, Inc., Lake Forest, CA (US)

( * ) Notice: Subject to any disclaimer, the term of this patent is extended or adjusted under 35 U.S.C. 154(b) by 1154 days.

(21) Appl. No.: 10/000,375

(22) Filed: Oct. 31, 2001

(51) Int. Cl.
*H04N 5/445* (2006.01)

(52) U.S. Cl. .............. 725/39; 725/11; 386/83
(58) Field of Classification Search .............. 386/1, 386/6–8, 46, 52, 67–70, 83, 94–95, 125; 725/11, 12, 14, 20, 28, 32, 38, 39, 46, 50, 725/153, 88–102; 345/716, 721; 360/7, 360/72
See application file for complete search history.

(56) References Cited

U.S. PATENT DOCUMENTS 6,351,596 B1 * 2/2002 Ostrover ............... 386/46

2002/0054068 A1 * 5/2002 Ellis et al. ............ 345/716
2002/0188948 A1 * 12/2002 Florence ............... 725/46
2003/0005431 A1 * 1/2003 Shinohara .............. 725/12

* cited by examiner

*Primary Examiner*—Robert Chevalier
*Assistant Examiner*—Mishanwn Dunn

(74) *Attorney, Agent, or Firm*—Knobbe, Martens, Olson & Bear

(57) ABSTRACT

A method of operating a personal video recorder, which is coupled to a display device to selectively present broadcast programs and recorded content to a viewer, maintains a viewing menu in the personal video recorder. The viewing menu includes for a predetermined day of a week at least channel and time information of broadcast programs the viewer has previously selected on the predetermined day of a previous week. The method displays the viewing menu on the predetermined day of the week to enable the viewer to select between executing and not executing the viewing menu in accordance with at least the channel and time information of the broadcast programs. Further, the method selectively updates the viewing menu upon viewer input on the predetermined day of the week to provide for a history of broadcast programs the viewer actually selected on the predetermined day of the week.

16 Claims, 4 Drawing Sheets

PERSONAL VIDEO RECORDER AND METHOD ENABLING A HISTORY PULL DOWN FUNCTION FOR PROGRAM SELECTION

BACKGROUND OF THE INVENTION

1. Field of the Invention

The invention relates to a personal video recorder and a method of operating the personal video recorder. More particularly, the invention relates to a personal video recorder and a method that facilitates selecting programs from a multitude of broadcast programs.

2. Description of the Related Art

A personal video recorder, hereinafter referred to as PVR, like a conventional video cassette recorder (VCR), is coupled to a monitor or a television set in a viewer's home and receives broadcast signals via a coaxial cable, a satellite dish or an antenna for terrestrial radio frequency (RF) signals. In order to record a particular program, the viewer must "program" the video recorder so that the video recorder starts and stops recording the program at a predetermined day and time. A PVR includes a hard disk drive with a storage capacity of between 20 GB and 60 GB that allows recording of up to 80 hours of television programming.

Broadcast systems, such as "cable television" (CaTV) or "satellite television," provide a multitude of TV channels, each having a multitude of programs during a typical day. The TV channels are listed in a program guide that gets larger as more TV channels are added. To alleviate this problem, cable television and satellite television systems provide electronic program guides which assist a viewer to select a program the viewer wants to record or wants to watch as "live TV."

The conventional system enables the viewer to receive the multitude of programs from which the user can select preferred programs, for example, for watching as "live" TV or for recording. Although the user may use program guides in paper or electronic format, or may "surf" through the programs on a daily basis, the number of program channels, potentially hundreds of broadcast channels, make a program selection tedious and very time consuming, in particular on a daily basis. There is therefore a need to improve upon the prior art technique for presenting broadcast programs to a user so that the user's selection of preferred programs is facilitated.

SUMMARY OF THE INVENTION

The present invention may be regarded as a method of operating a personal video recorder that is coupled to a display device to selectively present broadcast programs and recorded content to a viewer. The method maintains a viewing menu in the personal video recorder, wherein the viewing menu comprises for a predetermined day of a week at least channel and time information of broadcast programs the viewer has previously selected on the predetermined day of a previous week. The method displays the viewing menu on the predetermined day of the week to enable the viewer to select between executing and not executing the viewing menu in accordance with at least the channel and time information of the broadcast programs. Further, the method selectively updates the viewing menu upon viewer input on the predetermined day of the week to provide for a history of broadcast programs the viewer actually selected on the predetermined day of the week.

The present invention may be regarded as a personal video recorder configured to connect to a display device to selectively present broadcast programs and recorded content to a viewer. The personal video recorder includes a memory device and a management module. The memory device is configured to maintain a viewing menu that includes for a predetermined day of a week at least channel and time information of broadcast programs the viewer has previously selected on the predetermined day of the week. The management module is in communication with the memory device to retrieve and present the viewing menu to the viewer at the predetermined day of the week. The management module is configured to display the viewing menu on the predetermined day of the week to enable the viewer to select between executing and not executing the viewing menu in accordance with at least the channel and time information of the broadcast programs, and to prompt the viewer to selectively update the viewing menu on the predetermined day of the week to provide for a history of broadcast programs the viewer actually selected on the predetermined day of the week.

BRIEF DESCRIPTION OF THE DRAWINGS

These and other aspects, advantages, and novel features of the invention will become apparent upon reading the following detailed description and upon reference to the accompanying drawings. In the drawings, same elements have the same reference numerals.

DETAILED DESCRIPTION OF THE PREFERRED EMBODIMENT

Figure 1:
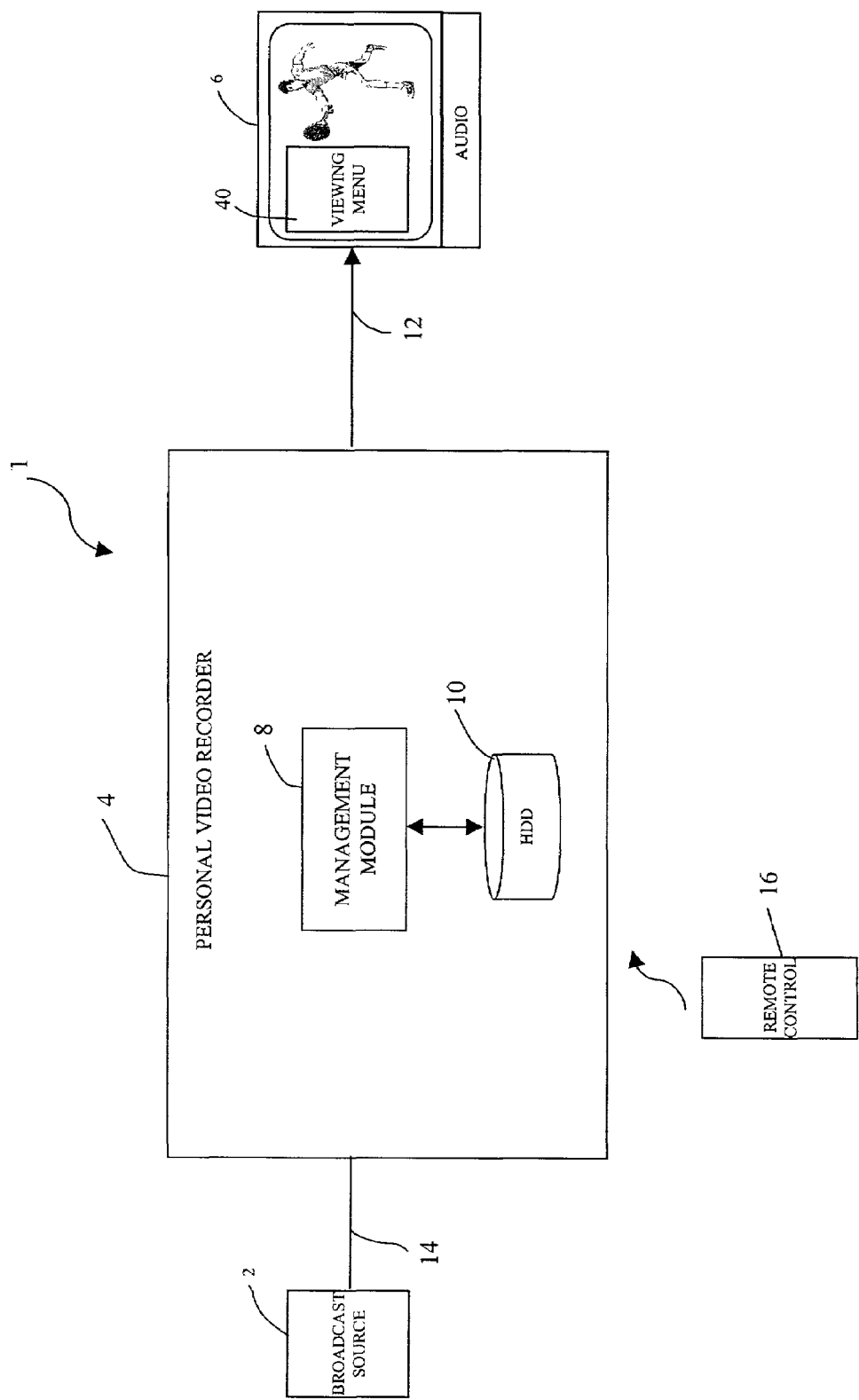
FIG. 1 shows an embodiment of a system for displaying broadcast programs that includes a broadcast source, a personal video recorder with a storage device and a management module, and an audio/display device for displaying the broadcast programs and a viewing menu.

FIG. 1 illustrates an embodiment of a system 1 for presenting broadcast programs from a content provider to a viewer. The broadcast programs may include various kinds of content, such as video programs (including video-on-demand and pay-per-view content), audio programs, graphics, images, text, or data. The system 1 is configured to operate in accordance with the method of the present invention. Hereinafter, the term "broadcast program" is used to refer to the various kinds of content available from, for example, from the content provider for presentation to the viewer, and may include "live" programming and locally recorded content including audio/video content and still pictures. Further, the term "watching" is hereinafter used to refer to the viewer's acts of watching, listening, reading or viewing.

The system 1 includes a broadcast source 2 and a personal video recorder 4 ("PVR") coupled to the broadcast source 2 via a connection 14. The broadcast source 2 may be located within a remote head end under control of the content provider. The content provider may be a multiple service operator ("MSO") as known in the art. In another embodiment, the broadcast source 2 may be a set top box located in the viewer's home and configured to receive the broadcast programs from the remote head end. In yet another embodiment, the broadcast source 2 may be a tuner within the PVR 4. The broadcast source 2 is therefore generally considered as a "source" for broadcast programs for use by the PVR 4, regardless where the broadcast source 2 is located.

The PVR 4 is coupled via a connection 12 to an audio/display device 6 that presents a viewing menu 40 and selected broadcast programs to the viewer. The PVR 4 includes a storage device 10 (e.g., a hard disk drive) indicated as "HDD" and a management module 8. Among other functions, the storage device 10 maintains the viewing menu 40, and the management module 8 displays the viewing menu 40 and updates the viewing menu 40 as described hereinafter. The PVR 4 may be controlled by the viewer using a remote control 16. It is contemplated that the PVR 4 is one example of an audio/video-capable apparatus in which the present invention is implemented. In another embodiment, the present invention may be implemented in a personal computer coupled to a monitor. It is further contemplated that an audio/video-capable apparatus may be generally used to either present video content, audio content or both to a user.

Figure 2:
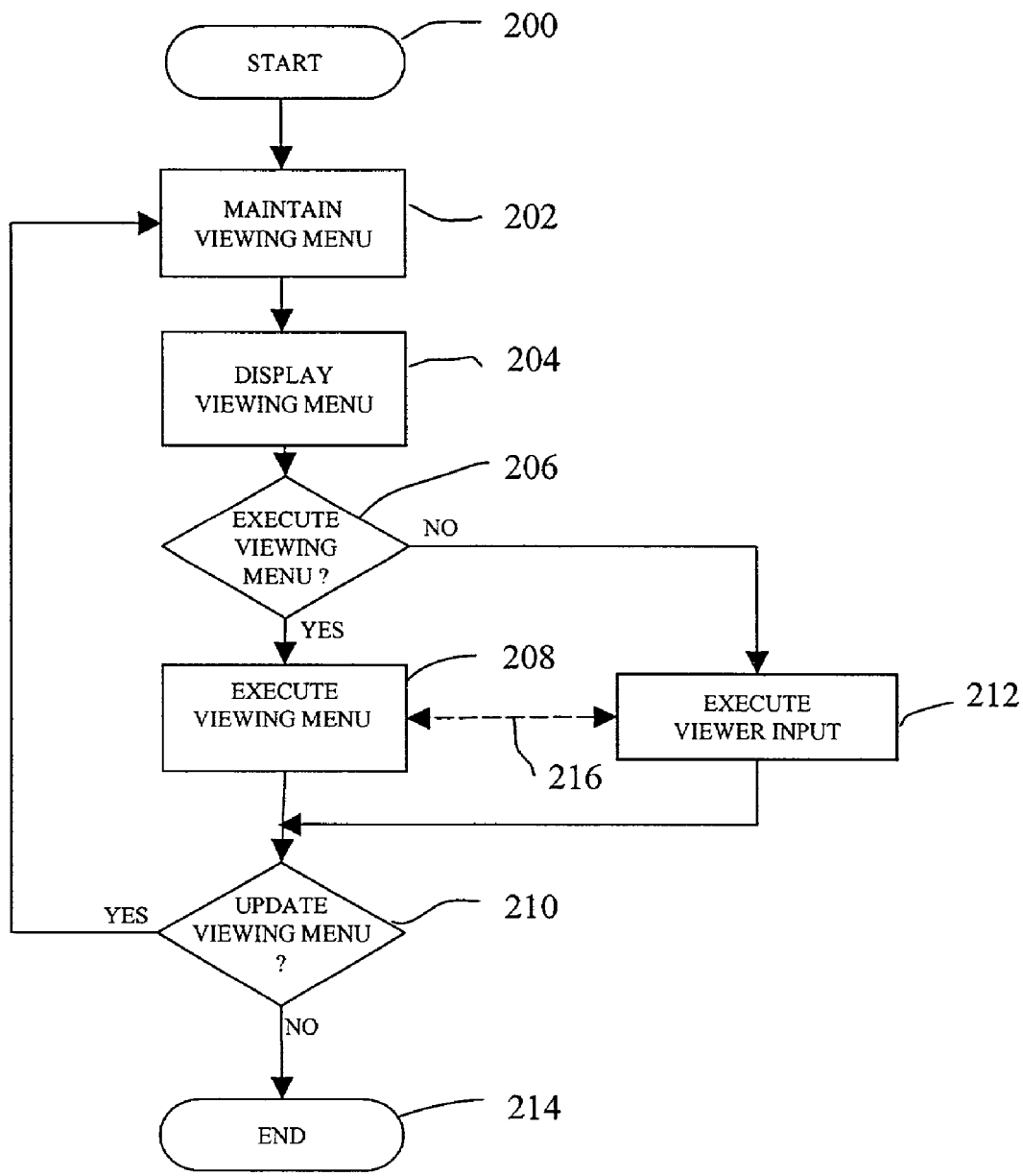
FIG. 2 is a flowchart of a procedure illustrating a method of operating the personal video recorder that maintains a viewing menu within the personal video recorder, prompts a viewer to select between executing and not executing the viewing menu, and selectively updates the viewing menu to provide for a history of broadcast programs the viewer actually selected on predetermined day of the week.

FIG. 2 is a flowchart of a procedure illustrating the method of operating the PVR 4 coupled to the audio/display device 6 to selectively present broadcast programs and recorded content to the viewer. Advantageously, the method facilitates the viewer's operation of the PVR 4 and the daily selection of programs from the multitude of programs available from the broadcast source 2. Whenever the method is active, for example, when the viewer triggers the procedure during a viewing session at a predetermined day of a week, or when the viewer turns the audio/display device 6 on, the method presents the viewing menu 40 to the viewer for the viewer to select between executing and not executing the viewing menu 40. In one embodiment, the method further facilitates the operation of the PVR 4 by automatically changing channels, recording broadcast programs and playing recorded broadcast programs, audio/video content or still pictures, or a combination of these activities, in accordance with the viewing menu 40.

In a step 200, the procedure initializes the system 1 and executes routine procedures to determine whether the system 1 is operating and properly connected. In the following description of a preferred embodiment of the procedure, the viewer has properly set up the system 1 and has used the viewing menu 40 before.

In a step 202, the procedure maintains the viewing menu 40 in the PVR 4, for example, stored on the storage device 10. The viewing menu 40 includes for a predetermined day of a week at least channel and time information of broadcast programs the viewer has previously selected on the predetermined day of a previous week. For example, the viewing menu 40 includes for a viewing session on Tuesday evening those broadcast programs the viewer selected on the Tuesday evening of the previous week. The viewer can define the duration of a viewing session on a per-day basis, for example, three hours on a weekday and six hours on a Saturday and a Sunday.

The procedure maintains the viewing menu 40 in a database, for example, implemented in the storage device 10. The database is organized in segments for various viewers, for at least one day of the week, and for at least one viewing session. The procedure obtains the respective information either by tracking a viewer's selections on a predetermined day of the week, or by receiving viewer input. The procedure stores the obtained information in the database and updates the information if necessary. The procedure's updating of the viewing menu 40 can include deleting entries, overwriting entries, and time-stamping any updates.

Figure 4:
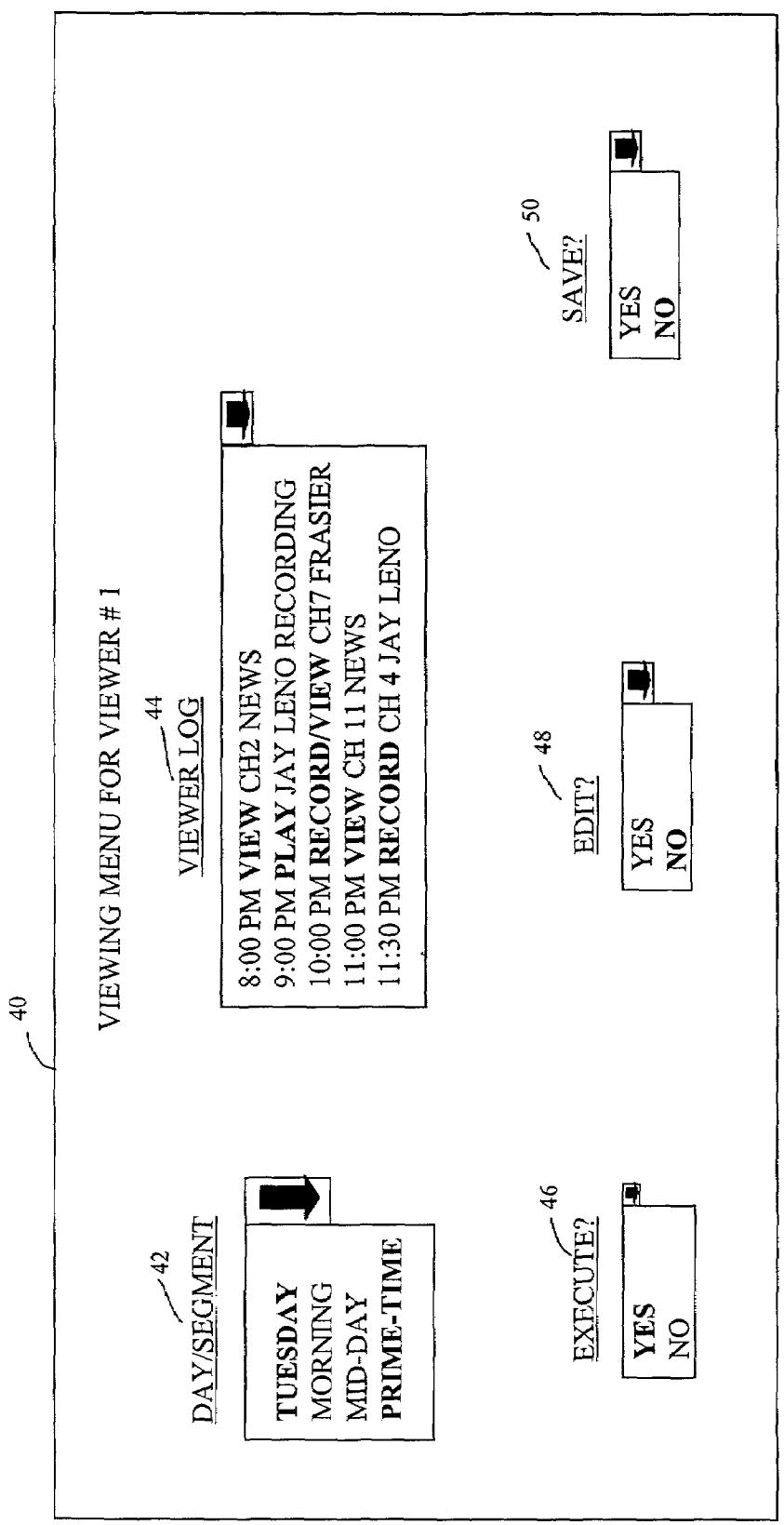
FIG. 4 illustrates an embodiment of a viewing menu displayable on the audio/video device.

In a step 204, the procedure displays the viewing menu 40 on the predetermined day of the week to enable the viewer to select between executing and not executing the viewing menu 40 in accordance with at least the channel and time information of the broadcast programs. An exemplary viewing menu 40 that the procedure displays on the audio/display device 6 is shown in FIG. 4 and described below. Using, for example, the remote control 16, the viewer can navigate through and select from the viewing menu 40.

In one embodiment, when the viewer activates the system 1, the procedure initially displays a broadcast program, for example, the currently available broadcast program of the last selected broadcast channel. If the viewer does not like the displayed broadcast program, the viewer can use the remote control 16 to open the viewing menu 40, which the procedure then displays to the viewer.

In an alternative embodiment, the procedure displays the viewing menu 40 when the viewer activates the system 1. The procedure may display the viewing menu 40 for a predetermined duration. If the viewer fails to provide any input, the procedure closes the viewing menu 40 and displays a broadcast program, for example, the currently available broadcast program of the last selected broadcast channel.

In a step 206, if the viewer selects to execute the viewing menu 40 on the predetermined day of the week, the procedure proceeds along the YES branch to a step 208. If the viewer selects to not execute the viewing menu 40, the procedure proceeds along the NO branch to a step 212. In one embodiment, the system 1 may have a default setting in which the procedure closes the viewing menu 40 if the viewer does not select to execute the viewing menu 40 within, for example, ten seconds, and continues to present the currently available broadcast program of the last selected broadcast channel.

In the step 208, the procedure executes the viewing menu 40 on the predetermined day of the week. That is, the procedure operates the PVR 4 in accordance with at least the channel and time information of the broadcast programs. For example, at a first specified time, the procedure automatically operates the system 1 so that the PVR 4 receives the appropriate broadcast channel to present at that time a first broadcast program to the viewer. At a second specified time, the procedure automatically operates the system 1 so that the PVR 4 receives another broadcast channel to present at that time a second broadcast program to the viewer. The procedure executes the viewing menu 40 until a last "entry" has been executed and proceeds to a step 210.

In the step 212, i.e., when the viewer selects not to execute the viewing menu 40 on the predetermined day of the week, the procedure detects if there is any viewer input at all. If the viewer on that day of the week decides to watch broadcast programs other than those defined in the viewing menu 40, the procedure operates the PVR 4 in accordance with the viewer input until the viewer decides to terminate the viewing session. Upon corresponding viewer input, the procedure proceeds to the step 210.

It is contemplated that the viewer may interrupt the execution of the viewing menu 40 as indicated through a connection 216 between the steps 208 and 212. For example, the viewer may stop the execution of the viewing menu 40 for that day of the week and watch instead a broadcast program or recorded programs not defined in the viewing menu 40. Further, the viewer may resume the execution of the viewing menu 40 after a temporary interruption of the execution of the viewing menu 40.

In the step 210, the procedure selectively updates the viewing menu 40 upon viewer input on the predetermined day of the week to provide for a history of broadcast programs the viewer actually selected on the predetermined day of the week. That is, if the viewer interfered with the execution of the viewing menu 40 or concluded that the viewing menu 40 no longer represents the viewer's preferences on that day of the week, the procedure prompts the viewer whether to update the viewing menu 40. If the viewer decides to update the viewing menu 40, the procedure returns along the YES branch to the step 202 and updates the viewing menu 40 maintained in the PVR 4. If the viewer decides not to update the viewing menu 40, the procedure proceeds along the NO branch. The procedure ends at a step 214.

Figure 3:
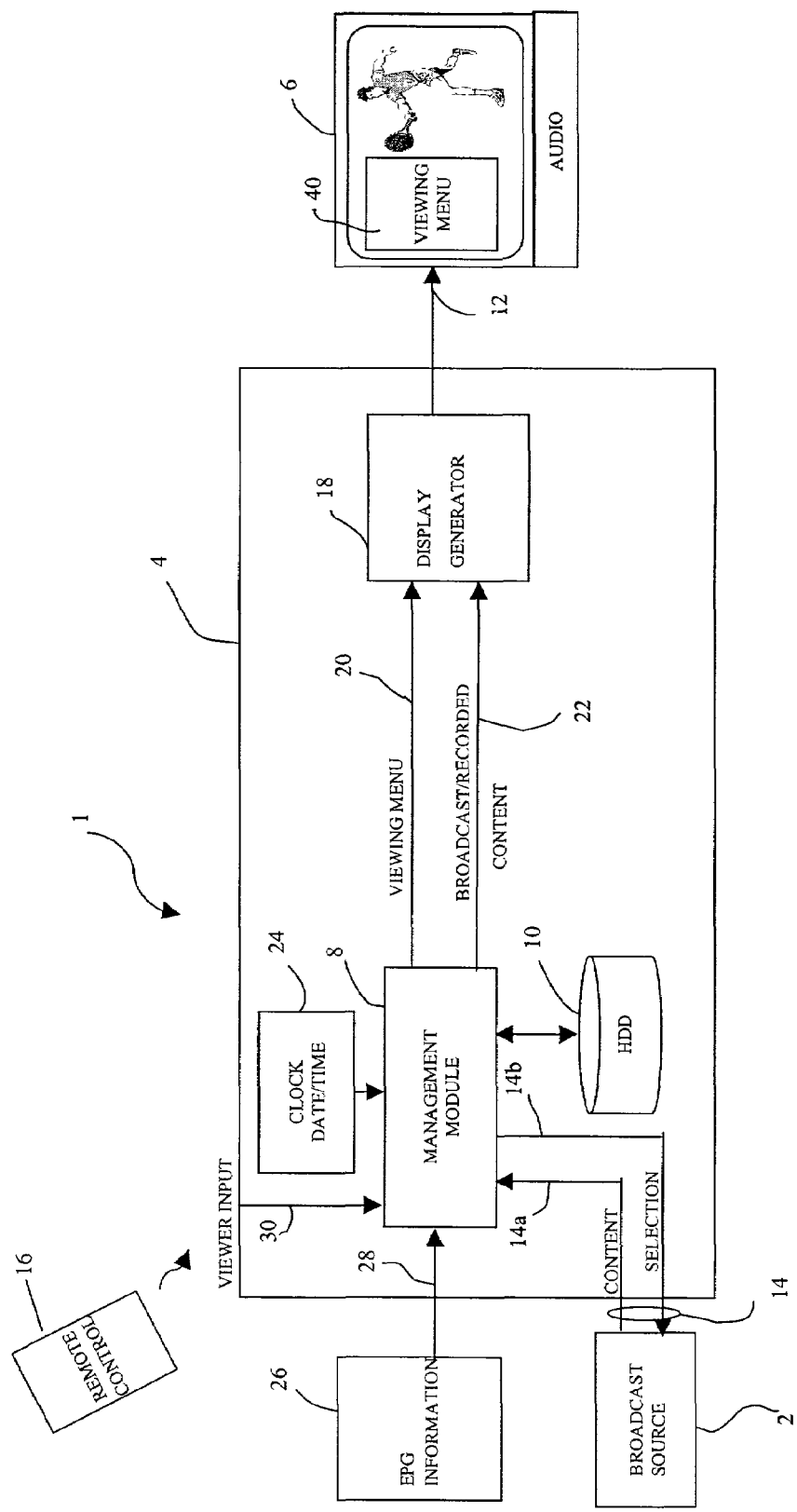
FIG. 3 shows an embodiment of the personal video recorder of FIG. 1 that includes the management module coupled to the storage device, an internal clock and a display generator, and that is in communication with the broadcast source and receives viewer input and program information.

FIG. 3 shows an embodiment of the PVR 4 of FIG. 1 that is interconnected between the broadcast source 2 and the audio/display device 6. In addition to the management module 8 coupled to the storage device 10, the PVR 4 shown in FIG. 3 includes an internal real-time clock 24 with calendar function, and a display generator 18. The clock 24 and the display are coupled to the management module 8, wherein the display generator 18 is coupled to the audio/display device 6. FIG. 3 shows further that the PVR 4 is configured to receive viewer inputs via the remote control 16 and electronic program information from an EPG module 26.

The electronic program information may be received as an electronic program guide (EPG). In FIG. 3, the EPG module 26 is shown as being located outside the PVR 4 to indicate the PVR 4 receives the EPG information from an external source. In another embodiment, the EPG module 26 may be shown as being located inside the PVR 4 and may be considered by the PVR 4 as the "source" of the EPG information for use by the PVR 4. It is contemplated that the EPG information may be received together with the broadcast programs from the broadcast source 2 and may be separated from the broadcast programs either within the PVR 4 or within a set-top box. Further, the EPG information may be received via the Internet or via a dial-up telephone link between the PVR 4 and the provider of the EPG information. The EPG information may be stored within the PVR 4 and periodically updated.

In one embodiment, the PVR 4 presents the EPG information as a menu from which the viewer may select a broadcast program for watching as a "live" program or for recording. If the user decides to record a program, the PVR 4 records the selected program immediately upon viewer input or later and automatically at a scheduled day and time. Details of an exemplary personal video recorder are disclosed in copending U.S. patent application Ser. No. 09/585,249, filed on May 31, 2000 and entitled "Digital Video Recorder Connectable To An Auxiliary Interface Of A Set-Top Box That Provides Video Data Stream To A Display Device Based On Selection Between Recorded Video Signal Received From The Digital Video Recorder And A Real-Time Video Signal," the whole content of which is incorporated by reference herein.

The management module 8 controls the operation of the PVR 4. Therefore, the management module 8 is in communication with the EPG module 26 via a connection 28, the display generator 18 via connections 20, 22, the broadcast source 2 via connections 14a, 14b, a viewer input line 30, the clock 24 and the storage device 10. The management module 8, based on the viewing menu 40 or a viewer input, "selects" the requested broadcast program via the connection 14b and receives the selected broadcast program from the broadcast source 2 via the connection 14a. The connections 14a, 14b are therefore labeled as "CONTENT" and "SELECTION," respectively. Further, the management module 8 outputs data representing the viewing menu 40 via the connection 20 and the broadcast programs or recorded content via the connection 22.

In the illustrated embodiment, the PVR 4 sends a command via the connection 14b to the broadcast source 2. The broadcast source 2 tunes to the appropriate broadcast channel and forwards the broadcast program of the selected broadcast channel via the connection 14a to the PVR 4. In one embodiment, the tuning functionality of the broadcast source 2 is implemented in a set top box. In another embodiment, the tuning functionality is implemented within the PVR 4 that includes at least one tuner. It is contemplated that the PVR 4 can display the broadcast program while recording the broadcast program, or record the broadcast program while displaying another broadcast program. Further, it is contemplated that the PVR 4 permits the viewer to pause "live" TV and to resume at a later time where the "live" TV was paused.

As known in the art, the functions of a set top box include, among others, tuning to a certain broadcast channel, and processing and formatting a selected broadcast program for display on the audio/display device 6. Further details of a set top box are disclosed in copending U.S. patent application Ser. No. 09/605,623, filed on Jun. 28, 2000 and entitled "Set-Top Box Connectable To A Digital Video Recorder Via An Auxiliary Interface And Selects Between A Recorded Video Signal Received From The Digital Video Recorder And A Real-Time Video Signal To Provide Video Data Stream To A Display Device," the whole content of which is incorporated by reference herein.

In one embodiment, the management module 8 is implemented in connection with a central processor unit based on a RISC processor, such as, for example, an ST20 processor that is commercially available from STMicroelectronics. The RISC processor is controlled by a real-time operating system, such as, for example, the OS/20 operating system from STMicroelectronics. In alternative embodiments, the central processor unit may be based on Intel Corp. or AMD, Inc. microprocessors, and utilize the Microsoft Windows or Linux operating system. Software running on the OS/20 platform, for example, is used to implement the procedure described with reference to FIG. 2. For example, such software controls the PVR 4 and provides for the programming of a graphical user interface that manages the viewing menu 40 shown in FIG. 4 and allows the viewer to interact with the PVR 4.

The central processor unit is further in communication with a compression engine, and the storage device 10. The storage device 10 has a storage capacity of between 20 GB and 60 GB to selectively store and, thus, record digital information such as sequences of streaming video data received from the compression engine. That is, the storage device 10 may store up to 80 hours of compressed video and audio data. The compression is often achieved by using a standardized process defined by the Moving Picture Expert Group (MPEG), e.g., MPEG-2, or MPEG-4. The recorded streaming video data is then available for later reproduction when the viewer decides to watch the recorded streaming video data. As is known in the art, the compression engine also decompresses the video data when the recorded streaming video data is played back.

It is contemplated that in one embodiment, the PVR 4 may be configured to perform MPEG-2 compression and decompression and to selectively store the MPEG-2 compressed video data on the storage device 10. In another embodiment, the system 1 may be configured so that the PVR 4 receives MPEG-2 compressed video data. The PVR 4, thus, selectively stores the MPEG-2 compressed video data without prior compression within the PVR 4.

The display generator 18 receives the data that represents the viewing menu 40 via the connection 20 and the "live" or recorded broadcast program via the connection 22. The display generator 18 processes the received data and broadcast program and generates an image that forms the basis of the display 4 with the promotion content 8. The image generator 14 "builds" the image in accordance with conventional techniques. The display generator 24 converts this image into a signal format that can be displayed on the audio/display device 6. For example, the signal format may be in accordance with known video/television formats such as NTSC, PAL, S-Video, RGB or the like. The display generator 18 outputs the generated signal to the connection 12, which is connected to the audio/display device 6.

The display generator 18 includes further an on-screen display ("OSD") engine. The OSD engine of the display generator 18 can selectively mix text, graphics, or additional video images with the broadcast program. In one embodiment, the OSD engine causes the viewing menu 40 to be displayed without any other display content. Thus, when the viewer uses the remote control 16 to open the viewing menu 40, the audio/display device 6 stops displaying the broadcast program and displays only the viewing menu 40. In another embodiment, the OSD engine causes the viewing menu 40 to be displayed together with a broadcast program or the EPG information.

FIG. 4 illustrates an embodiment of a viewing menu 40 displayable on the audio/display device 6. The illustrated viewing menu 40 is personalized for a particular viewer, indicated as "VIEWER #1." However, it is contemplated that, for example, each member of a family may define a personal viewing menu 40. Further, the viewing menu 40 is for a particular day of the week and may be divided by the viewer into segments. It is contemplated that each viewer may define a viewing menu 40 for each day of the week.

In the illustrated embodiment, the viewing menu 40 includes several pull-down submenus the viewer can control using the remote control 16. A submenu 42, labeled as "DAY/SEGMENT," shows the current day of the week for which the viewing menu 40 is defined. Further, the submenu 42 divides that day into segments, for example, morning, mid-day and prime-time. In FIG. 4, the submenu 42 is for prime-time on Tuesday, as indicated in bold letters. In another embodiment, the submenu 42 may show the segments as a function of time, for example, from 8:00 a.m. to 11:30 a.m., and 8:00 p.m. to 12:00 p.m. The segments therefore represent predetermined windows of time during which the system 1 is active. A window of time may represent a viewing session during which the viewer in fact watches TV, or a combination of a viewing session and a "silent" session during which the viewer is absent and the PVR 4 records one or more broadcast programs.

A submenu 44, labeled as "VIEWER LOG," lists broadcast programs and activities for the day and segment specified in the submenu 42. In one embodiment, the submenu 44 includes a "history" of what the viewer watched and recorded on the same day (e.g., Tuesday) of the previous week. According to the exemplary submenu 44, the viewer:

watched the news on Channel 2 between 8:00 p.m. and 9:00 p.m., watched a previously recorded Jay Leno show between 9:00 p.m. and 10:00 p.m., watched and recorded on Channel 7 Fraser between 10:00 p.m. and 11:00 p.m., watched the news on Channel 11 between 11:00 p.m. and 11:30 p.m., and started to record the Jay Leno show on Channel 4 at 11:30 p.m.

Thus, the submenu 44 of the viewing menu 40 comprises for the predetermined day "Tuesday" at least channel and time information of broadcast programs the viewer has previously selected on Tuesday of the previous week. Other information includes the name of the "live" or recorded broadcast program and an activity associated with each entry, e.g., VIEW, PLAY, RECORD/VIEW and RECORD. The viewing menu 40 permits the viewer to review the submenu 44 and to decide whether he or she wants to watch, record, or watch and record the same broadcast content as on the same day of the previous week.

In addition to such an embodiment in which the viewing menu 40 represents a "history pull down function," the viewer can set up the viewing menu 40 for a particular day of the week using the EPG information and the remote control 16. For example, upon activation of the system 1 and prior to a viewing session, the viewer can display the EPG information for that day and for a desired time window of that day. Once the viewer identifies broadcast programs he or she wants to watch and/or record during the time window, the viewer can tag the identified broadcast program and indicate whether a broadcast program is for watching as "live" TV and/or for recording. The PVR 4 is configured to transfer the tagged broadcast programs into the submenu 44 and set the day and segment in the submenu 42 accordingly. The PVR 4 then automatically executes the viewing menu 40 for the specified time window. It is contemplated that the viewer may set up the viewing menu 40 in the described manner for the present day and for the following days and weeks.

A submenu 46, labeled as "EXECUTE?," permits the viewer to trigger execution of the viewing menu 40. If the viewer decides to execute the viewing menu 40, the PVR 4 automatically changes the broadcast channels, displays "live" broadcast programs, plays recorded broadcast programs and records broadcast programs at the times specified in the submenu 44. In the illustrated embodiment, the execution starts at 8:00 p.m. and ends at 12:00 p.m. on Tuesday night.

A submenu 48, labeled as "EDIT?," permits the viewer to edit the submenu 44, either before triggering the execution of the viewing menu 40, during the execution, or at the end of the execution. The viewer can use the remote control 16 to edit the submenu 44. For example, the viewer can call up the EPG information for a specific day and select broadcast programs to be transferred to the submenu 44. Further, the viewer can use the keypad of the remote control 16 to directly edit the submenu 44, for example, by inputting the day, time and channel of a desired broadcast program, or by inputting a program code published in program guides. The submenu 48 therefore permits the viewer to update the viewing menu 40.

A submenu 50, labeled as "SAVE?," permits the viewer to save any changes and updates made to the viewing menu 40. If the viewer made any changes to the viewing menu 40, the PVR 4 automatically prompts the viewer whether or not the viewer wishes to save the changes. If the changes are saved, the PVR 4 presents the updated viewing menu 40 to the viewer on the same day of the next week. It is contemplated that the viewer may "undo" the changes, for example, in the next week if necessary.

What is claimed is:

1. A method of operating a personal video recorder coupled to a display device to selectively present broadcast programs and recorded content to a viewer, comprising:

maintaining a viewing menu in the personal video recorder, wherein the viewing menu comprises for a predetermined day of a week at least channel and time information of broadcast programs the viewer has previously selected on the predetermined day of a previous week;

displaying the viewing menu on the predetermined day of the week to enable the viewer to select between executing and not executing the viewing menu in accordance with at least the channel and time information of the broadcast programs; and selectively updating the viewing menu upon viewer input on the predetermined day of the week to provide for a history of broadcast programs the viewer actually selected on the predetermined day of the week.

2. The method of claim 1, wherein the viewing menu is defined for a viewing session having a predetermined length.

3. The method of claim 1, wherein the menu further comprises information about recorded content.

4. The method of claim 3, wherein the recorded content includes at least one of audio/video content and still pictures.

5. The method of claim 1, further comprising generating a plurality of different viewing menus for the viewer.

6. The method of claim 5, wherein the different viewing menus are for different predetermined days of a week.

7. The method of claim 1, further comprising generating a plurality of different viewing menus for different viewers.

8. The method of claim 1, further comprising executing the sequence of broadcast programs if the viewer selects execution.

9. The method of claim 8, wherein executing the sequence of broadcast programs includes automatically changing channels in accordance with the time information of the viewing menu.

10. The method of claim 1, further comprising tracking a viewer's actual selections of broadcast programs and storing the actual selections in a log file.

11. The method of claim 10, further comprising prompting the viewer whether or not to update the menu with the actual selections stored in the log file.

12. The method of claim 1, further comprising editing the viewing menu by tagging a broadcast program for viewing as live TV.

13. The method of claim 12, further comprising automatically tuning to a broadcast channel to receive the tagged broadcast program in accordance with the viewing menu.

14. The method of claim 1, further comprising editing the viewing menu by tagging a broadcast program for recording.

15. The method of claim 14, further comprising automatically tuning to a broadcast channel to receive and record the tagged broadcast program in accordance with the viewing menu.

16. A personal video recorder configured to connect to a display device to selectively present broadcast programs and recorded content to a viewer, comprising:

a memory device configured to maintain a viewing menu, wherein the viewing menu comprises for a predetermined day of a week at least channel and time information of broadcast programs the viewer has previously selected on the predetermined day of the week; and a management module in communication with the memory device to retrieve and present the viewing menu to the viewer at the predetermined day of the week, wherein the management module is configured to display the viewing menu on the predetermined day of the week to enable the viewer to select between executing and not executing the viewing menu in accordance with at least the channel and time information of the broadcast programs, and to prompt the viewer to selectively update the viewing menu on the predetermined day of the week to provide for a history of broadcast programs the viewer actually selected on the predetermined day of the week.

* * * * *